US007435564B2

(12) United States Patent
Serna-Saldivar et al.

(10) Patent No.: US 7,435,564 B2
(45) Date of Patent: Oct. 14, 2008

(54) PRODUCTION OF INVERT SYRUP FROM SUGARCANE JUICE USING IMMOBILIZED INVERTASE

(75) Inventors: Sergio R. Serna-Saldivar, San Pedro Garza García, N.L. (MX); Marco A. Rito-Palomares, Monterrey N.L. (MX)

(73) Assignee: Instituto Technologico y de Estudios Superiores de Monterrey, Monterrey (MX)

( * ) Notice: Subject to any disclaimer, the term of this patent is extended or adjusted under 35 U.S.C. 154(b) by 0 days.

(21) Appl. No.: 10/952,242

(22) Filed: Sep. 28, 2004

(65) Prior Publication Data
US 2005/0084939 A1 Apr. 21, 2005

Related U.S. Application Data

(60) Provisional application No. 60/507,149, filed on Sep. 29, 2003.

(51) Int. Cl.
C12P 19/02 (2006.01)
C12P 19/14 (2006.01)
(52) U.S. Cl. .................... 435/105; 435/99; 127/46.2
(58) Field of Classification Search .............. 127/46.2; 435/99, 105
See application file for complete search history.

(56) References Cited

U.S. PATENT DOCUMENTS

| 3,788,945 A | 1/1974 | Thompson et al. |
| 3,935,068 A | 1/1976 | Nystrom |
| 3,935,069 A | 1/1976 | Long |
| 3,980,521 A | 9/1976 | Amotz et al. |
| 4,110,164 A | 8/1978 | Sutthoff et al. |
| 4,242,450 A * | 12/1980 | Honda et al. .............. 435/68.1 |
| 4,405,715 A | 9/1983 | Monsan |
| 4,543,330 A | 9/1985 | Morimoto et al. |
| 4,918,016 A | 4/1990 | Leuba et al. |
| 5,270,177 A | 12/1993 | Ramos Lazcano et al. |
| 5,314,814 A | 5/1994 | Harder et al. |
| 5,405,764 A | 4/1995 | Harder et al. |

(Continued)

FOREIGN PATENT DOCUMENTS

GB 2198438 A 6/1988

(Continued)

OTHER PUBLICATIONS

Urbaniec, "The evolution of evaporator stations in the beet-sugar industry", available online Jul. 22, 2003, Journal of Food Engineering 61(2004)505-508 doi:1016/S0260-8774(03)00218-8.*

(Continued)

Primary Examiner—David M Brunsman
(74) Attorney, Agent, or Firm—Darby & Darby

(57) ABSTRACT

This invention is directed to a novel process in which raw sugarcane juice is first refined through a number of steps and then bioenzymatically converted into refined invert syrup or glucose-fructose concentrated solution using a reactor packed with immobilized invertase. The refining steps preferably include a first filtration (particle filtration or microfiltration) followed by a second filtration (microfiltration or ultrafiltration) and then at least one pass through a column packed with an anionic exchange resin. The refined sugarcane juice can be optionally concentrated and/or pasteurized before passing through a reactor packed with immobilized invertase to convert sucrose to glucose-fructose.

39 Claims, 4 Drawing Sheets

U.S. PATENT DOCUMENTS

| | | | |
|---|---|---|---|
| 5,468,300 | A | 11/1995 | Monclin |
| 5,494,811 | A | 2/1996 | Scott et al. |
| 6,013,491 | A | 1/2000 | Martinez |
| 6,228,178 | B1 * | 5/2001 | Saska .......................... 127/42 |
| 6,406,548 | B1 | 6/2002 | Donovan et al. |
| 6,709,527 | B1 * | 3/2004 | Fechter et al. ............. 127/46.2 |

FOREIGN PATENT DOCUMENTS

| | | | |
|---|---|---|---|
| GB | 2198438 A | * | 6/1988 |
| WO | WO 00/60128 | | 10/2000 |

OTHER PUBLICATIONS

Sinan Akgol, et al., "Hydrolysis of sucrose by invertase immobilized onto novel magnetic polyvinylalcohol microspheres", Food Chemistry (2001)vol. 74, pp. 281-288.

T. Bahar, et al., "Immobilization of Invertase onto Crosslinked Poly (p-chloromethylstyrene) Beads", Journal of Applied Polymer Science,(2002) vol. 83, pp. 1268-1279.

S.F. D'Souza, et al., "Immobilization of invertase on rick husk using polyethylenimine", J. Biochem. Biophys. Methods,(2002) vol. 52, pp. 59-62.

Hsyue-Jen, Hsieh, et al., "Immobilization of invertase via carbohydrate moiety on chitosan to enhance its thermal stability", Biotechnology Letters (2000) vol. 22, pp. 1459-1464.

Andrea Tam, et al., "Reversible Immobilization of Invertase on Sepabeads Coated with Polyethyleneimine: Optimization of the Biocatalyst's Stability", Biotechnol. Prog.,(2002) vol. 18, pp. 1221-1226.

Aziz Tanriseven, et al., "Immobilization of invertase within calcium alginate gel capsules", Process Biochemistry,(2002) vol. 36, pp. 1081-1083.

H. Tumturk, et al., "Immobilization of invertase attached to a granular dimer acid-co-alkyl polyamine", Food Chemistry(2000) vol. 69, pp. 5-9.

* cited by examiner

PRODUCTION OF INVERT SYRUP FROM SUGARCANE JUICE USING IMMOBILIZED INVERTASE

FIELD OF THE INVENTION

This invention relates to a method for converting sugarcane juice or concentrate into invert (glucose-fructose) syrup using immobilized invertase.

BACKGROUND OF THE INVENTION

Due to their sweetness and liquid form, invert syrups are widely utilized by different segments of the food industry such as the soft drink and baking industries. Syrups are preferred over crystallized sugar because they offer processing advantages. Due to their sweetness and liquid presentation and similarity with the 42 and 55 (the numbers designate fructose content as a weight percentage of total sugar content) fructose corn syrups, invert syrups are in high demand for soft drink manufacturing. Currently, refined sugar represents 60-62% of the total sugar produced in the world from sugar cane and other non-sugarcane sources of sugar. 19.2 million hectares are planted per year with sugar cane and other non-sugarcane sources, yielding an average of 142 million metric tons of crystallized sugar. In 2002, Mexico was the sixth world producer [FAO 2003] with approximately 5.2 million tons of raw sugar production. Recently, however, the industry has come under financial pressure due to price competition from overseas manufacturers of glucose and high fructose corn syrups as well as other non-sugarcane sources. Thus, there is a need to develop more efficient processes for refining sugarcane juice and for producing invert syrup, which represents a commercially and strategically attractive product. Furthermore, it would be advantageous to retrofit and modify existing sugar cane mills, to produce invert syrup efficiently without eliminating the mills' ability to produce table sugar or sucrose.

During the past decades the food and biotechnological industries have increasingly used immobilized enzymes for various processes. The main advantages of the immobilized enzyme technology are: lower production costs and improvement in production capacity due to the ability to recover and re-use the biological catalysts, which are especially suited for high-yield continuous processes. Furthermore, the immobilized enzyme is more stable and the product can be essentially free of trace contamination by the enzyme, which makes it easy to purify the resultant product (Messing 1975, Rosevear 1984).

One of the drawbacks of immobilized enzymes is the possible decrease in their productive life due to enzyme inactivation caused by substrate contaminants. Raw sugarcane juice, in particular, contains significant quantities of invertase inhibitors such as proteinaceous and other nitrogenous compounds both soluble and insoluble, phenolics, flavonoids, anthocyanins, waxes, and minerals (Clarke and Godshall 1988, Donovan 1993).

In a conventional cane sugar refining process, the raw sugarcane juice is normally limed, deaerated and clarified (removal of suspended solids, usually by sedimentation) and the resulting semi-refined juice or melter liquor is purified by clarification (carbonation via addition of lime and carbon dioxide or phosphatation via addition of lime and phosphoric acid) and decolorization (Clarke and Godshall 1988, Donovan 1993). This conventional treatment, however, would be inadequate as a preparation for a conversion step using immobilized invertase. Adding further refining steps prior to conversion would make the economics of such a process unfavorable or even prohibitive. Adequate prior purification of the substrate is important to ensure a more efficient use of the immobilized invertase reactor. One type of process, (Donovan et al., U.S. Pat. No. 6,406,548; Monclin 1995 U.S. Pat. No. 5,468,300) proposes filtering sucrose containing cane juice through ultrafiltration, ultracentrifugation and nanofiltration. The resulting juice can be used in evaporation and crystallization operations to produce crystals of white sugar. Monclin U.S. Pat. No. 5,468,300 describes a method to produce sugar from sugarcane without using conventional refining processes but using instead ultracentrifugation or ultrafiltration and removal of discolorants through adsorption. Additionally Monclin employs viscocity modifiers. South African published patent application No. ZA200107964 also proposes the use of microfiltration, ultrafiltration and anion exchange as refining steps for sugarcane juice or concentrate prior to its crystallization into table sugar. But none of these references proposes conversion of the thus refined sugarcane juice to invert syrup through use of an immobilized invertase reactor.

Enzyme reactors with immobilized invertase are capable of producing invert sugar solutions. Invertase (beta-D-fructofuranosidase fructohydrolase EC 3.2.2.26) hydrolyzes sucrose into fructose and glucose. Sucrose may also be converted to glucose and fructose through acid hydrolysis. Industrial scale processes for manufacturing glucose-fructose solutions from sucrose generally use acid hydrolysis, which is expensive, because it can be practiced only in a batch or semi-continuous process. Furthermore, acid hydrolysis which is conducted at pH 2-3 produces a low-quality invert syrup containing furfural and other undesirable colored compounds. The use of refining and sucrose conversion in a continuous process, especially one starting from raw sugarcane juice and adapted to be practiced on an industrial scale for the production of invert syrups has not been previously reported.

Numerous methods for preparing immobilized enzymes and using them for other purposes have been described such as the methods and uses described by Nystrom in U.S. Pat. No. 3,935,068; by Long in U.S. Pat. No. 3,935,069; by Amotz et al. in U.S. Pat. No. 3,980,521; by Monsan in U.S. Pat. No. 4,405,715; by Morimoto et al., in U.S. Pat. No. 4,543,330; by Sutthoff in U.S. Pat. No. 4,110,164; by Leuba et al. in U.S. Pat. No. 4,918,016; by Harder et al. in U.S. Pat. Nos. 5,314, 814 and 5,405,764; and by Kasumi et al. (1977) and Tsumura et al. (1978). Messing (1975) and Rosevear (1984) reported that the catalytic activity of immobilized enzymes is maintained for longer periods of time compared to enzymes used in solution. But again, none of these references propose adapting these techniques to a process for making invert syrup production from sugarcane juice, much less to one practiced on an industrial scale.

Martinez in U.S. Pat. No. 6,013,491 describes methods for preparing and using yeast adhered to a fibrous cellulose support for converting sucrose into glucose and fructose and Ramos Lazcano in U.S. Pat. No. 5,270,177 describes a method for the production of glucose-fructose syrups from sucrose using a recombinant yeast strain. Some support systems allow regeneration of invertase activity when the column is treated with chemical compounds (Torres et al. 2003).

SUMMARY OF THE INVENTION

An object of the present invention is to provide a novel process for making invert (glucose-fructose) syrups from raw sugarcane juice. A more specific object of the present invention is to provide a continuous process for making invert syrups from raw sugarcane juice, which process can be practiced economically on a large scale.

Raw sugarcane juice without need for prior conventional treatments (such as one or more of liming, deaeration, and clarification through carbonation or phosphatation or sedimentation) is first preferably refined to remove solids as well as soluble materials, which can foul up the enzyme or otherwise reduce the performance and efficiency of a reactor containing a bed of immobilized enzyme.

These purification steps can preferably be performed using a combination of (i) at least two filtration stages and (ii) an anionic exchange, all in a continuous unit operation. The juice can then be bioenzymatically converted to invert syrup in a column containing a bed of immobilized invertase. The filtration stages can include a combination of coarser filtration (e.g., particle filtration) and finer filtration (e.g., microfiltration), or a combination of microfiltration (coarser) and ultrafiltration (finer), or all three, or one or two of them in combination with yet another filtration step. The only constraint is that the coarser filter should be used first and that no filtration step should employ a filter so fine that it would retain sugar molecules (such as fructose or glucose or sucrose) that are the desired constituents or precursors of constituents of the final product. Thus, no filtration step should retain substances having a m.w. of 400 or less (corresponding to a size of about 0.003 μm). Preferably the two-stage filtration step should retain substances having a m.w. of 4000 or even higher, e.g., 10,000 Daltons, thus making it possible to use less stringent membrane technologies and less expensive filtration systems. There should preferably be a pasteurizing step especially when ultrafiltration is not employed. Pasteurizing may be optionally practiced even when ultrafiltration is employed. Whether pasteurization is needed or not also depends on the time delay between juice extraction and completion of the two-stage filtration step. Preferably pasteurization is combined with concentration.

It is advantageous for the present process that the refined sugarcane juice be partially concentrated (preferably up to about 50-55° Brix) before entering the enzymatic conversion stage. This means that there can be a concentration step immediately before the enzymatic conversion or earlier in the process, e.g., simultaneously with the anion exchange step or between two such steps (e.g., by concentrating all or some of a reflux portion of the output of the anion exchange step) or prior to anion exchange (at the end of all filtration) or before completion of filtration (between an earlier and a later filtration step). The concentration step can be advantageously combined with a pasteurizing step.

Further preferred is to re-subject the partially concentrated (or unconcentrated) filtered juice to another anion exchange purification stage prior to the enzymatic conversion stage, or a reflux portion of the refined juice can be concentrated (or further concentrated) before being redirected to the anion-exchange stage.

Starting material for the present invention is preferably raw (i.e., freshly extracted without processing) sugar cane juice obtained after pressing the sugarcane. This is converted to invert syrup using an immobilized invertase enzyme, preferably in a totally continuous process. The sugarcane juice is refined prior to conversion to remove solids and substances (both soluble and insoluble) that would inhibit, or otherwise inactivate, or impede the performance of the bioenzymatic conversion step. Conveniently, a first fraction of solid contaminants can be removed by a filtering process practiced in at least two stages such as particle filtration or microfiltration. A second fraction of solid contaminants and a first fraction of soluble contaminants can be removed by a second filtering technique such as microfiltration (or ultrafiltration). Most preferably, both microfiltration and ultrafiltration are employed, in fact in that order, optionally further in combination with an ordinary particle filtration step that would be performed first. Thereafter, a column packed with an anionic exchange resin may be used to remove additional soluble contaminants.

In a typical preferred embodiment, the sugarcane juice has a sugar content of 15-23° Brix after extraction from sugarcane. 92-96% of the sugar content of sugarcane as extracted is sucrose. In turn, sugar represents 75-92% of the solids content of the sugarcane juice. Sugarcane juice is passed at least once through a microfiltration unit equipped with a 0.2 μm membrane and an ultrafiltration unit equipped with a membrane with a molecular weight cut off of 10,000 daltons. The microfiltration and ultrafiltration steps also remove many microorganisms, leaving the juice with a decreased microbial load. These purification steps are selected for their ability to remove contaminants, while minimizing loss of sugar. The resulting ultrafiltered (semi-purified) sugarcane juice is passed at least once through a column packed with an anionic exchange resin that has strong affinity for phenolic and nitrogenous contaminants, such as Diaion WA 30 (Sigma Aldrich St Louis Mo.) resin. These purification steps are selected to remove contaminants, but not sugar.

In an alternative preferred embodiment the raw sugar cane juice is first filtered using a particle filter (sieve) passing particles no larger than 250 microns or even a 100 mesh to thus remove those solid particles. (A HONIRON (Jeanerette, La.) Self Cleaning Rotary Screen may be used for this purpose.) The juice emerging from this stage is preferably pasteurized, and preferably simultaneously partially concentrated, e.g., to 40-50° Brix, and then fine-filtered through at least one finer filter, preferably a microfiltration membrane device. The juice emerging from microfiltration is subjected to anion exchange. An advantage of this embodiment is that a relatively expensive step, ultrafiltration, is replaced by a relatively inexpensive set of steps, particle filtration preferably combined with pasteurization, the latter to reduce the microbial load since (unlike ultrafiltration) ordinary filtration does not remove bacteria or other microorganisms.

At this point, the refined sugarcane juice can be partially or further concentrated if a concentration step has been performed earlier (up to about 50-55° Brix). The finished invert syrup product should be 68° Brix or more (typically up to about 70°) to discourage development of microorganisms and to reduce transport costs. The sugar cane juice after the filtration steps and preferably after one pass through an anion exchange column can be concentrated up to 70° Brix (preferably to about 50-55° Brix) using conventional evaporators such as the ones commonly employed in the sugarcane or syrup industries while still being susceptible to purification by an anion exchange column. The treated sugarcane juice can preferably be further refined (e.g., through one or more additional anion exchange columns) before passing through a packed bed reactor with immobilized invertase. During evaporation, all contaminants are concentrated so, if desired, the concentrate can be advantageously passed once or several more times through the same or a different anionic resin column. Several bench scale tests show that this additional, post-concentration anion exchange refining step further lowered 42% of the residual phenolics and 24% of the residual proteins respectively in a sugarcane juice concentrated to 50-55° Brix after one pass through an anion exchange column, and then re-subjected to a second anion exchange step. This additional step produces syrups with lighter color and further prolongs the immobilized enzyme half-life in the conversion reactor. Alternatively, or in addition to multiple anion exchange steps, a reflux portion of the anion exchange treated juice can be concentrated prior to returning it to the anion-exchange column.

Prior to entering the enzymatic hydrolysis column, the anion exchange treated optionally concentrated sugar cane juice preferably has the following values:

sugar content: 15-25° Brix, if not concentrated, and up to about 50° Brix if concentrated;
sucrose content: 92-96% by weight of the total sugar content;
residual (dissolved) non-sugar solids content: less than 1% by weight;
residual (dissolved) phenolics compounds content: 53.24 ppm;
residual mineral content: 0.08% or less by weight.

It is believed that the process of the invention also greatly reduces the flavonoids, anthocyanins and waxes content of the sugarcane juice.

The reactor conditions and flow rate can be adjusted to achieve conversions exceeding 90%. It is important to obtain at least 90% conversions, otherwise residual sucrose can crystallize and degrade syrup quality. Invertase works optimally at pH 4.5 to 6.0 and a temperature of 45 to 60° C., so it is preferred that the conversion step be performed under temperature and pH control. The resulting invert syrup can be optionally further concentrated using conventional evaporators (typically to about 70° Brix), pH adjusted (to within the range 4.0 to 5.0) or further refined using an anionic column such as that described above or another adsorption means such as a system employing activated carbon by way of illustration. Concentration, which leads to a reduced volume and increased Brix content has the effect of discouraging development of microorganisms and reducing transport costs. The additional post-conversion treatment will remove residual protein and remaining undesirable colored compounds.

In another aspect, the invention is directed to apparatus comprising equipment for performing the foregoing continuous unit operations namely a microfiltration unit, an ultrafiltration unit connected in-series to and downstream from the microfiltration unit for receiving the microfiltered juice and producing ultrafiltered juice, an anion-exchange column with or without reflux capability (the reflux stream exiting the column optionally connected as input to a concentration stage and the output being returned to the column), an anion-exchange column receiving ultrafiltered juice and producing anion-exchange treated sugarcane juice and a column reactor containing invertase mounted on a solid support.

Advantages of the present invention include without limitation the ability to effect the conversion to invert syrup efficiently and continuously using a process readily adapted to commercial scale, and the ability to extend enzyme life and uninterrupted column reactor operation and thus to improve process efficiency.

Additional objectives, features and advantages of the invention will be more readily understood from the detailed description below.

DETAILED DESCRIPTION OF THE INVENTION

Figure 1:
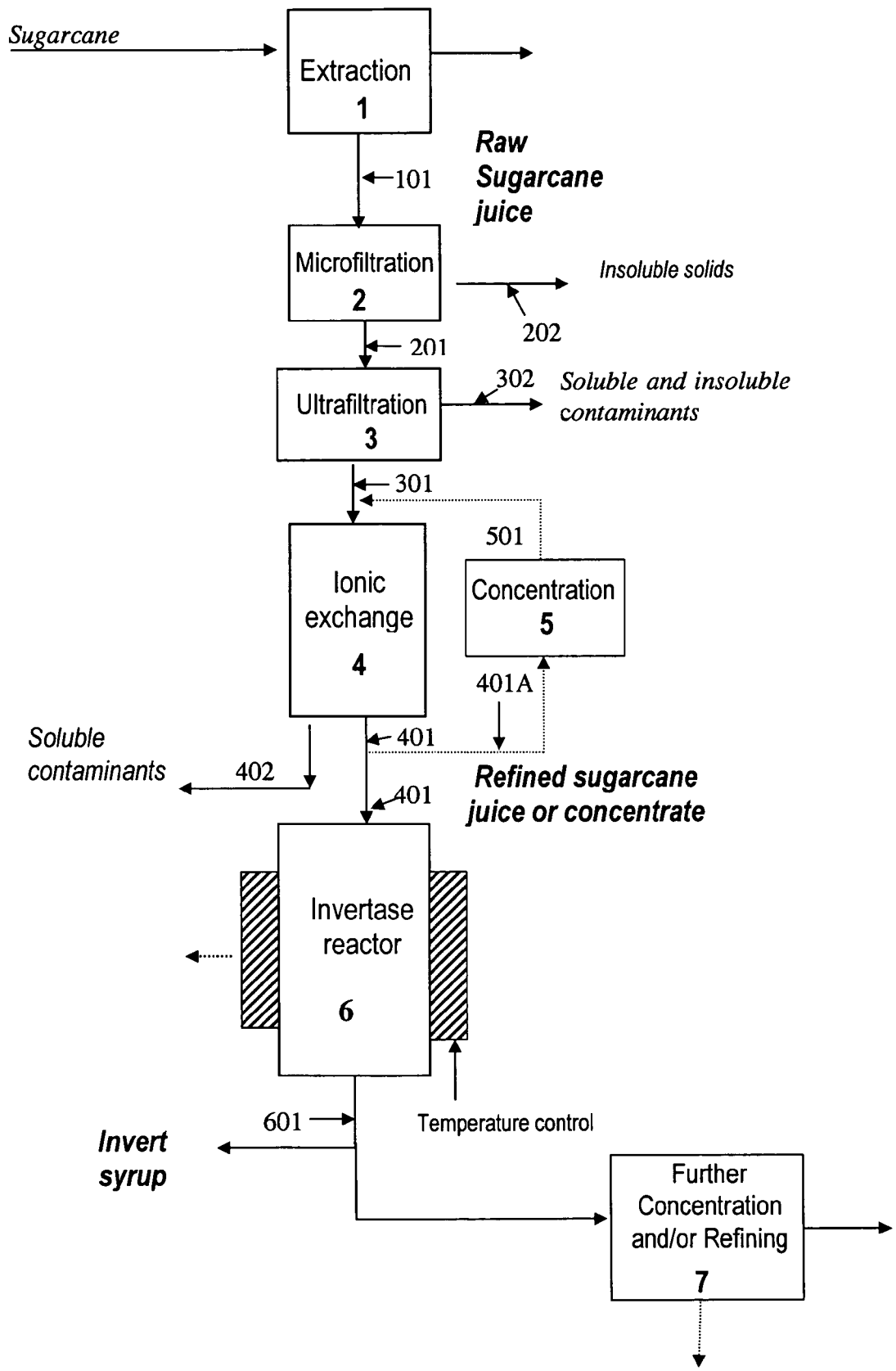
FIG. 1 is a flow diagram of a process for making invert syrup according to the present invention.

In one embodiment, the present invention is directed to a novel process for invert syrup production utilizing raw sugarcane juice obtained via conventional extraction processes. The invention comprises a first stage, (purification and optional partial concentration of the raw sugarcane juice) and a second stage (enzymatic conversion of the refined sugarcane juice using immobilized invertase and optional further concentration of the resulting invert syrup as illustrated in FIG. 1). After obtaining the raw sugarcane juice by traditional extraction procedures (mashing, treatment with lime and/or other conventional refining steps to remove coarse solids, thereby improving clarity and to remove color can be and are preferably omitted except possibly for a sedimentation step to remove coarse solids), the juice is filtered and anion exchange purified in preparation for the conversion step. Additional refining steps can follow the conversion step.

The sugarcane juice undergoes solid removal operations, such as microfiltration and ultrafiltration or particle filtration and microfiltration with the aim of removing fine insoluble contaminants and a significant first fraction of soluble contaminants. A microfiltration unit equipped with 0.2 μm diameter filtration membrane serially followed by an ultrafiltration unit equipped with a membrane to separate contaminants with molecular weights higher than 10,000 daltons (which corresponds to sizes higher than 0.005 μm) are particularly preferred. Lower molecular weight cutoffs are acceptable, as described supra, as long as they do not cause the retention of sugar molecules nor lead to unnecessarily increased equipment and process costs. (As used herein, substantially retaining sugars contained in the sugar cane juice means retaining at least 85% and preferably at least 90% of the original sugar content of the juice.) These two separation techniques practiced in series significantly reduce (typically by more than 90%) the original raw sugarcane juice insoluble protein content as determined with the Biuret technique (Gornall et al, 1949). Alternatively, a combination of particle filtration using a filter passing, e.g., 100 mesh followed by microfiltration as described immediately above can be practiced. Preferably, the juice will be pasteurized and optionally simultaneously concentrated to, e.g., 35-50° Brix between the first and second filtration step. The pasteurization step is of greater benefit in embodiments where ultrafiltration is not employed.

Each of these process steps can be performed more than once, yielding still better solids removal. However, even after such sophisticated solids depletion techniques, the sugarcane juice product will still contain soluble components that adversely affect invertase and/or reactor performance. For this reason, the partially refined sugarcane juice is further subjected to an anion-exchange step for reducing undesirable soluble components. A wide variety of anion exchange materials can be used: e.g., diethylaminoethyl cellulose, styrene, acrylic and agarose. Agarose is preferred from the point of view of cost; cellulose is preferred as providing both good performance and low cost.

Removal of undesirable soluble components can be preferably accomplished through an anionic exchange column that possesses a strong affinity for phenolics and nitrogenous compounds. This anion exchange step proved to be highly efficient to clarify the juice and to remove further undesirable compounds in preparation for the enzymatic conversion.

Pasteurization can be carried out at a temperature as low as 61.5° C. or at a higher temperature, e.g., 72° C. Care should be taken not to affect quality of the invert syrup adversely, so after conversion lower concentration and pasteurization temperatures should be used.

EXAMPLE 1

With particular reference to FIG. 1, sugarcane was extracted using conventional techniques in extraction stage 1. The raw extract 101 (characteristics shown in Table 1) at a flowrate of 12.0 L/hr was passed through a Quick Stan Bench-top system containing a microfiltration unit (2 in FIG. 1) manufactured by A/G Technology model no. QSM-04SAP equipped with a 0.2 µm filtration membrane under a max 30 psi pressure drop conditions to yield a microfiltered sugarcane juice 201 having characteristics illustrated in the second column of Table 1. The contaminants 202 were mostly proteins, peptides, phenolics and other colored compounds. Microfiltered juice 201 was then subjected to ultrafiltration using a unit manufactured by A/G Technology, model no. QSM-04SAP (3 in FIG. 1) under a max 30 psi pressure drop conditions to yield ultrafiltered sugarcane juice 301. The contaminants 302 were mostly proteins, peptides, phenolics and other colored compounds. The ultrafiltered juice 301 was then subjected to anion exchange column (4 in FIG. 1) under pH 5.5 conditions using a glass column, a weak anionic exchange resin (Diaion WA 30) commercially available from Sigma Aldrich (St. Louis Mo.). The resin had an average particle size of 16-50 µm, it was a porous resin activated with alkylamine and had a capacity of 1.5 meq/ml (Supelco). The resin was previously treated with a 0.05 M sodium phosphate solution adjusted to pH 5. The glass column used to pack the resin had a 30 cm length and an internal diameter of 2.5 cm. The 15 cm long packed resin bed was treated with a sodium acetate buffer until the pH of the exiting solution was 4.5. The ultrafiltered sugarcane juice was passed once through the column. In this step, approximately 50% of the phenolic compounds were removed, as estimated with the Folin Ciocalteau analytical procedure (Swain and Hillis 1959).

The anion exchange treated sugarcane juice 401 had the characteristics set forth in the column of Table 1.

At this point, the entire stream 401 can be concentrated in concentration stage (5 in FIG. 1) and passed through the same anion-exchange column, or a reflux portion of it, stream 401A can be concentrated, prior to returning it through the same column (stream 501 in FIG. 1) which might be returned to the column at an intermedian point depending on the impurity content of the concentrated reflux stream. Alternatively, stream 401, can be concentrated and passed through a second anion-exchange column (not shown). Redirecting the concentrate 501 through anion exchange column 4 (or passing it through another anion-exchange column) removes additional soluble contaminants resulting in a further purified stream (not separately shown in FIG. 1). Stream 401 then becomes the feed to the column reactor (6 in FIG. 1).

EXAMPLE 2

Invertase (Grade VII, Catalog number I 4504, Sigma Aldrich, St. Louis, Mo.) was immobilized by simple adsorption on chitosan beads (Chitopearl BCW 3505, Wako Chemicals USA, Inc.). The bead size was 350-390 µm and had an ionic exchange capacity of 0.2-0.3 meg/ml with a specific surface of 150-200 m$^2$/g. The chitosan beads were washed three times with distilled water and a 0.02 M sodium acetate solution (pH 4.5). The invertase was added to the chitosan beads at approximately 2,000 enzymatic units/g beads and the resulting suspension was kept under agitation for 60 min at room temperature. The solution was filtered and the chitosan beads containing the immobilized invertase were washed once with a 0.02 M sodium acetate solution (pH 4.5).

The enzyme material immobilized on chitosan beads was used to pack a 20 cm long jacketed column (Type XK-16 Pharmacia) with an internal diameter of 16 mm. The length of the immobilized enzyme support system was adjusted to 120 mm. Zirconium beads were placed on top and bottom of the column. Zirconium was used as an inert material simply to avoid column support losses. In commercial operations special mesh trays are used instead of zirconium or other inert materials. The column was equilibrated to a temperature of 50° C. by running heated water through the column jacket. The refined sugarcane concentrate 401 with 50-55° Brix was pumped through the column at a flow rate adjusted to cause a residence time of 10 min. The amount of sugars in the substrate and product was determined with the dinitrosalicilate acid colorimetric method and by high performance liquid chromatography equipped with a refractive index detector. Under these conditions more than 95% of the sucrose was converted to glucose and fructose (invert syrup). The glucose to fructose ratio in product stream was 1:1. The remaining characteristics of product stream 601 are also set forth in Table 1. Finally the invert syrup product 601 was concentrated to 68-70° Brix in evaporator 7 and optionally further refined to meet specifications demanded by the industry. These final adjustments can be performed using conventional unit operations and refining techniques such as the use of adsorption column packed with an activated carbon filter to improve syrup color.

EXAMPLE 3

Figure 2:
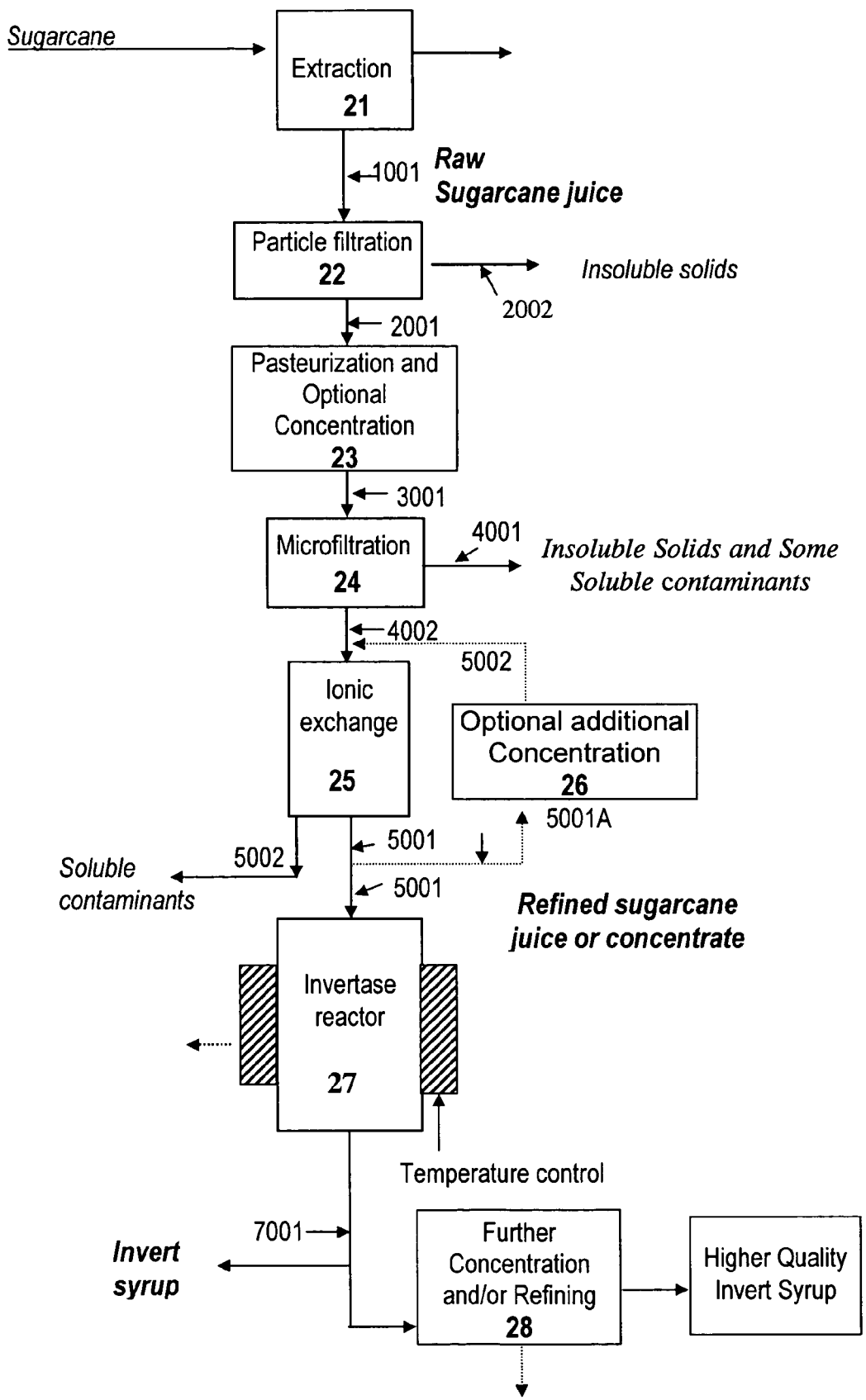
FIG. 2 is a flow diagram of another process for making invert syrup according to the present invention.

This Example is a batch wise simulation of a continuous process of an alternative preferred embodiment of the present invention. With particular reference to FIG. 2, sugarcane was extracted using conventional techniques in extraction stage 21. In first filtration stage 22, the raw extract 1001 having characteristics as shown in Table 2 was first passed through a sieve No. 100 (100 mesh) at ambient pressure. Relatively coarse solid contaminants 2002 were collected by the filter and discarded. The first-filtered juice 2001 is first pasteurized in step 23 at 61.5° C. for 0.5 hours (or at a higher temperature, e.g., 72° C. for a shorter time, e.g. 15 sec.) and at the same time evaporatively concentrated to 50° Brix. The pasteurized/concentrated juice 3001 was passed through microfiltration cartridge 24 (2800 cm$^2$, CFP-2E-6A made by Amersham Biosciences Buckinghamshire, UK) and having a membrane with a pore diameter of 0.2 µm equipped with a pump (E-trac WFCHT made by Inverter), operated at a pressure of 13 psi to remove fine solid particles (fine ashes, colored compounds) as well as to reduce yeast and bacterial load, and high molecular weight proteins (about m.w. >100 KD) which are discarded (4001).

Periodically, after 6-8 hours of use the microfilitration unit was regenerated by washing it twice with 0.2 M NaOH at 50° C. The NaOH needed to be washed off (3 times) with water or neutralized with 1N HCl.

The microfiltered juice, fine-filtered stream 4002, represents the two-stage filtered intermediate product. The characteristics of this intermediate product are shown in Table 2. The intermediate product still had an undesirable dark brown color, which indicated the presence of phenolics and other colored compounds.

The intermediate product 4002 was then subjected to anion exchange in step 25: it was fed at the top of a 500 ml column (450 ml work volume) equipped with Whatman DE52 anion-exchange resin microgranular, with a capacity of 0.88-1.08 meq/g (Whatman, N.Y., USA). Sodium phosphate buffer was used to equilibrate the column to a pH of 5 prior to feeding intermediate product 4002.

The anion-exchanged product 5001 emerging from the column had the characteristics shown in Table 2. The contaminants removed 5002 included phenolic acids and other colored compounds, leaving a pale yellow clear product 5001. These steps also would have lowered the content of invertase inhibiting nitrogenous compounds but measurements were not made in this Example.

The anion exchanged product 5001 was then subjected to enzymatic hydrolysis in step 27 using a column in which invertase (Maxivert L10000 from *Saccharomyces cereviciae* with an activity of 10,000 U/ml, DSM, France) was immobilized onto Chitopearls™ used as a support. Loading of the support with enzyme was accomplished as described in Example 4.

The column was maintained at 60° C., pH 5 and the conversion to invert syrup took place as the anion-exchanged product moved through the column. Chitopearls™ were chosen among other supports in part for their efficiency, low cost and low operating cost and in part because they have some ion-exchange capability which further improved the color of the syrup. A colorless liquid 7001 emerged from the catalytic column.

After the invertase was spent (due to microbial growth as a result of intermittent use totaling approximately 7 days) the support was washed with 1N NaOH to elute the invertase, washed three times with distilled water and loaded with fresh enzyme as described above. The support has a long useful life and can be cleaned, loaded with fresh enzyme and reused several times before it has to be replaced. Restricting the bacterial growth would extend the days of operation of the invertase.

The invert syrup emerging from the catalytic column had the characteristics given in Table 2.

The invert syrup may be concentrated to 68-70° Brix after the enzymatic conversion. Post-conversion concentration may be effected in a vacuum evaporator at 60° C. in order to avoid color formation of the invert syrup caused by the effect of higher temperatures.

Preconversion concentration will yield a product having 40-50° Brix immediately before conversion (this can be done using a portion or all of the anion exchange column product as illustrated in FIG. 2, stream 5001A into step 26 and concentrated stream 5002 back into the top or an intermediate point not shown of step 25). The various locations of concentrating stages in the process have different advantages and disadvantages. Preconversion concentration allows working with reduced volumes and decreases the rate of growth of microorganisms due to high concentration of solutes; however, the increased viscosity of the solution will affect negatively the performance of the microfiltration membranes (and ultrafiltration, if any) by causing an increased pressure drop.

EXAMPLE 4

Enzyme Immobilization

Figure 3:
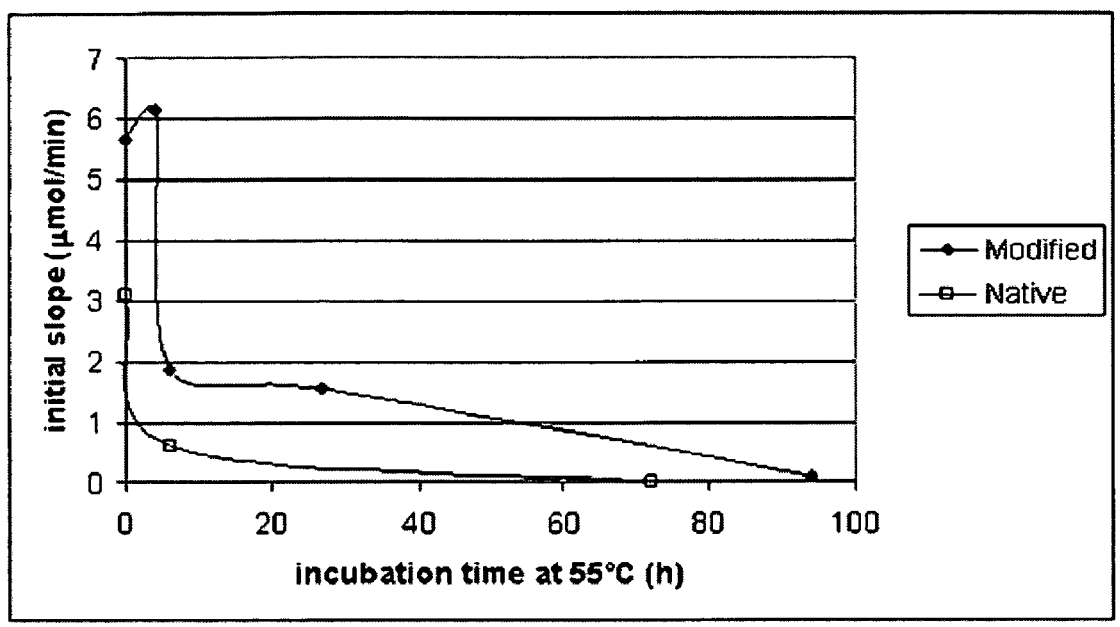
FIG. 3 is a plot of the remaining activity of native and modified invertase plotted against incubation time.

A 2500 U/mL invertase (Maxinvert L10,000, DSM, France) solution in 50 mM phosphate buffer pH 5 was modified according to the protocol reported by Hsieh (2000). 30 mg of invertase (412 U/mg) were dissolved in 29 ml of 50 mM phosphate buffer, pH 5.0 were mixed with 1 ml of 30 mM sodium periodate for 3 h at 4° C. in the dark. Unreacted sodium periodate was removed by adding 0.2 ml ethylene glycol and mixing for 30 min. Resultant periodate-oxidized invertase was dialyzed against 50 mM phosphate buffer, pH 6.0. FIG. 3 (a plot of the remaining activity at 55° C. in 1M sucrose pH 6 of native and modified invertase (2 U/ml) previously incubated at the same temperature plotted against incubation time) shows that the modified invertase has a higher activity than the native enzyme and that the modification step increased the useful life of the enzyme. For example, the native enzyme lost 75% of its initial activity in 6 hours, whereas the modified enzyme took around 27 hours.

Figure 4:
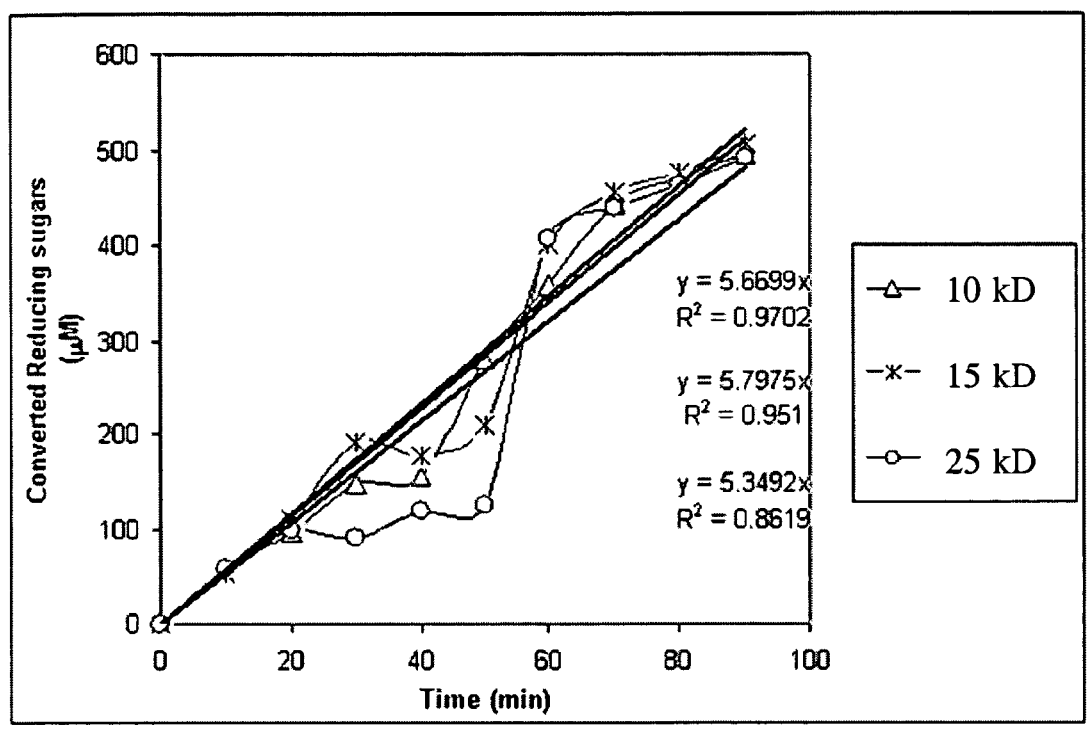
FIG. 4 is a plot of the modified invertase (2 U/ml) recovered by use of different dialysis membranes.

During the modification process, dialysis was used to eliminate the reactants needed for the modification (sodium periodate and ethylene glycol). Dialysis might be carried out using a 10 kDa molecular weight cutoff membrane (a higher m.w. cutoff membrane could be used, e.g., in excess of 25 kDa). Results shown in FIG. 4 (a plot of the activity at 55° C. in 1M sucrose solution at pH 6 of modified invertase (2 U/ml) recovered by different dialysis membranes having a molecular weight cutoff of 10 kDa, 15 kDa, and 25 kDa demonstrate that the activity of the modified enzyme is not influenced by the type of dialysis membrane.

Further experiments were performed using the modified enzyme to select the most convenient support for immobilization. Alumina, Sephabeads® and Chitopearls™ were used for this purpose. Chitosan beads were selected as support for enzyme immobilization since they are easy to prepare, their use is cheaper and their preparation faster than the other commonly used supports. Moreover, chitosan beads had a much longer useful life and used up less enzyme so the immobilization process was efficient. Lastly, as pointed out in Example 3, this support has some ion-exchange ability which further improves the clear color of the produced syrup.

Prior to immobilization, Chitopearls™ BCW 3505 (Fuji Spinning Co., Ltd, Japan) were washed three times with distilled water. Water excess was decanted and 40 g (50 ml) of Chitopearls™ were packed inside a 30 cm long and 1.5 cm internal diameter glass column (50 ml work volume) equipped with temperature jacket and mesk-and-cloth permeable caps in both ends of the column. Modified invertase was immobilized by simple absorption, i.e., passing the enzyme solution through the column to achieve a concentration of 1000-3000 IU/g. Before use, 50 mM $NaH_2PO_4$, pH 5 buffer was passed through the column until the exiting solution had a pH of 5. Operation temperature was fixed at 60° C. The immobilized enzyme was used to convert test solutions (sucrose in water containing 34-50% sucrose) to invert syrup. The conversion rate was high, starting at 100%. After 3 days of continuous operation, the conversion was still higher than 80%. Additionally, due to the ion-exchange properties of the Chitopearls™, the resulting invert syrup was almost crystal clear (L=66.14, a*=0.39, b*=2.11). No substantial difference in pressure drop was observed when increasing sugar concentration since the size and form of Chitopearls™ allows an easy flow through the column, indicating that more concentrated juice could be used. At this scale the flow was fixed in the range of 5-12 ml/min.

EXAMPLE 5

Effect of Ion Exchange on Decoloration

Microfiltered sugarcane juice was passed through a weak anionic exchange resin (Whatman DE52 pre-swollen microgranular anion exchange resin Whatman, N.Y., USA) in order to remove phenolic compounds and proteins.

Prior to use, the Whatman DE52 pre-swollen microgranular anion exchange resin was activated by adding 50 mM $NaH_2PO_4$, pH 5 buffer until achieving complete hydration.

Once the resin was hydrated and ready to use, 40 g of it were packed inside a 15 cm long and 2 cm internal diameter plastic column (50 ml work volume) equipped with a bottom filter. Microfiltered sugarcane juice flow (downward) was fixed at 8 ml/min using a peristaltic pump. Colored compounds of 2 L of microfiltered sugarcane juice were removed using 40 g of resin, yielding a light yellowish translucent liquid. Color parameters were measured with a Minolta colorimeter using a white standard as background and a D65 light source. CIELa*b* parameters (color space coordinates) indicate a more luminous color of the sample after ion exchange, changing L values from 34.02 to 63.72. The reddish coloration also decreased with a change from +3.92 to −2.85 of the a* values. This column was regenerated using 2 bed volumes (100 ml) of 1 N NaOH solution followed by 2 bed volumes of demineralized water and 2 bed volumes of NaH2PO4 50 mM, pH 5 buffer. Residual NaOH (100 ml, 1.0 N) was eliminated by neutralization with HCl 1 N.

EXAMPLE 6

Sucrose Conversion at Pilot Plant Scale

Invertase was immobilized in Chitopearls™ as described in Example 2 and packed in a 70-cm long and 7-cm internal diameter (2700 ml work volume) glass column equipped with heat exchange jacket and with permeable caps in both ends of the column. Before use, 50 mM $NaH_2PO_4$, pH 5 buffer was passed through the column until the exiting solution had a pH of 5. Operation temperature was fixed at 60° C. using hot water. Initial juice out was diverted until stable. The system was tested first with a 32° Brix sucrose solution at 9.6 L/h using a centrifuge pump (Fasco, Model 71632363). With a residence time of 14 seconds, the average total conversion was 96.0%. Concentration of fructose and glucose in the invert syrup was determined with the colorimetric method of dinitrosalicilic acid (DNS) reported by Miller (1959). G. L., *Anal Chem.*, 1959, 31: 426-428.

EXAMPLE 7

Production of Inverted Syrup from Sugarcane Juice at Pilot Plant Scale Without Pasteurization or Ultrafiltration.

Sugarcane juice was extracted using the conventional technique, which consists in mashing the sugarcane with a mechanical crusher. Raw sugarcane juice was passed manually as required during the tests in lots of 2 L through a sieve No. 100 (Tyler equivalent 100) in order to remove coarse solid particles that could affect further process stages. Solids (including ashes, stones and organic materials) were retained by the sieve while prefiltered sugarcane juice passed through it and was collected in reservoir tanks for further processing. This Example is also illustrated in FIG. 2 but no pasteurization nor optional concentration was performed (no step 22). The reference numbers to various streams in this Example 7 do not imply that the streams would have the characterization given in Table 2 for a different experiment.

First-filtered sugarcane juice was then finer filtered through a microfiltration membrane (Amersham Biosciences, CFP-2-E-6A) equipped with a pump (E-Trac WFCHT AC Inverter). The unit consisted of a 2800 $cm^2$ microfiltration membrane of 0.2 μm. Entrance and exit pressures were maintained at 13 and 0 psi, respectively and the pump speed maintained at 200 RPM. Under these conditions, the flow rate through the cartridge was 900 L/h, while the retained sugarcane juice (4001) had a flow of 895.2 L/h, which was recycled to the reservoir tank from which the sugarcane juice was taken. Microfiltered sugarcane juice (4002) had an average flow of 4.8 L/h and was collected in reservoir tanks for further processing. After use, the membrane needed to be washed with 20 L of NaOH 0.2 N at 50° C. in order to remove all solids attached to the surface and for sanitization. Residual NaOH (20, 0.2 N) was eliminated by neutralization with 4 L of 1 N HCl. The microfiltration equipment did not have sufficient capacity, and a larger unit should have been used. But this is a matter of optimization, within the skills of the art.

Microfiltered sugarcane juice (4002) passed downwardly through a 70 cm long and 7 cm internal diameter glass column packed with Whatman DE52 resin (1350 cc work volume) previously treated as described in Example 5. Microfiltered juice (4002) was pumped by the action of a peristaltic pump (Stenner 170DM5) at an average flow rate of 1.1 L/hr, yielding a light yellowish translucent liquid (5001) at the exit of the unit that was collected in reservoir tanks for further processing. Colorimetric changes in sugarcane juice were determined using the CEELa*b* scale (Minolta calorimeter), yielding the following parameters: from L*41.7, a*+6.75, b*+24.42 in the inlet sugarcane juice to L*61.17, a*−1.52, b*+14.94 in the outlet.

Operation time depended on the phenolic content of the sugarcane and downward compression of the column caused by the resin due to the differential pressure drop of the juice flow from top to bottom. This indicates the need to optimize the type of resin, possibly switching to a more efficient one: candidates are Dowex 66 by Sigma Aldrich, St. Louis, Mo., U.S.A. or even Chitopearls™, employed in the conversion step, which have considerable ion exchange capacity and which are likely to withstand the column pressure better. The average operation time using the conditions described herein was 5 hours, higher operation times yielded product with higher quantities of phenolic compounds due to progressive loss of the resin exchange capacity, affecting optical properties. Several anionic columns may be used in order to operate in a semi-continuous basis, switching from one to the other once saturation of the resin is reached. Saturation of the resin may be determined indirectly by measuring the CIELa*b* parameters in the outflow. After the resin has lost most of its ion exchange capability due to saturation with phenolic compounds it is regenerated with NaOH 1.0 N as described in Example 3.

Ion exchange treated sugarcane juice (5001) was passed through the enzymatic conversion column (27) described in Example 6. The ion exchange treated sugarcane juice actually flowed upwardly by the action of an adjustable flow centrifuge pump (Fasco, Model 71632363). When the sugarcane juice flow through the column was fixed at 12 L/h (with residence time of 10.5 seconds), the average total conversion was 89.7%, and when it was fixed at 6 L/h (with residence time of 21 seconds), the average total conversion was 98.0%. Invert syrup was collected in reservoir tanks for further processing.

After conversion, inverted syrup (7001) may be concentrated using an evaporator equipped with a vacuum pump. The evaporator would be charged with 20° Brix invert syrup until the operational volume is reached. After loading, the batch evaporator is closed and turned on. The evaporator would be set to operate at an average temperature of 55° C. and a pressure of −0.9 bars that would be reached in a time period according to the characteristics of the evaporator. Invert syrup inlet flow should be adjusted automatically by the evaporator control system at the same time that condensed water exits at its rated flow. Inverted syrup in the evaporator would be concentrated until it reached 70° Brix. Sugar concentration (° Brix) would be determined with a refractometer (such as SPER SCIENTIFIC, 0%-80%).

In its embodiment, the invention comprises the step of converting sugarcane juice/concentrate (preferably previously contaminant-depleted, as outlined above, using at least a two-stage filtration that combinedly eliminates contaminants larger than 0.2 μm and preferably even those larger than 0.005 μm) using immobilized invertase, placed in a packed bed reactor (fixed, moving or fluidized). There are several reports (Akgol et al., 2001, Bahar and Tuncel 2002, D'Souza and Godbole 2002, Tanriseven and Dogan 2001, Tumturk et al., 2000 and Torres et al., 2003) that show different ways to immobilize invertase on different supports. Any of the foregoing in principle can be used subject to cost constraints. Additional invertase immobilization techniques and supports are well-known and described in the patent literature reviewed in the background section.

There is a wide variety of immobilized support systems based on adsorption, entrapping, encapsulation, ionic exchange, cross-linking and covalent bonding. The most widely used support systems employ agar, alginates, chitosan, various polymers, polyacrylamide, cellulose, substituted cellulose, pectin, carbon and alumina (Akgol et al., 2001, Bahar and Tuncel 2002, D'Souza and Godbole 2002, Rosevear 1984, Tanriseven and Dogan 2001 and Tumturk et al., 2000) as the support material. Glutaraldehyde and polyethyleneimine are among the most popular and effective agents for immobilizing enzymes on solid supports and loading them on columns (Avrameas et al., 1969 and Torres et al., 2003).

There are different sources of invertase with different degrees of activity. Invertase has been successfully immobilized in different systems. Grade VII invertase from yeast having a specific activity of 2000 IU/g is preferred. It is important to optimize conditions to make a more efficient use of the enzymatic reactor. The process parameters that should be mainly considered are operational temperature and pH. A preferred temperature range is 45-60° C. and a preferred pH range is 4.5-6.0. Optimum temperature is 50° C. and pH 4.5. Preferred supports are alumina chitosan and acrylamides having the following ranges of characteristics: size 350-590 μm and specific surface 150-200 $m^2/g$.

With the aim of demonstrating the effectiveness of the invention three different immobilization supports were tested: entrapping, adsorption and cross-linking. The adsorption immobilization technique is the simplest. Optionally, the invert syrup product can be further concentrated which can be accomplished by conventional evaporation to at least 68° Brix and/or further refined, if necessary to remove residual protein, phenolic and undesirable colored compounds by adsorption on an anion exchange column with conditions such as described above and/or on an activated carbon column.

The entire process can be scaled up and automated with existing automation equipment and instruments. Among the advantages of the present process are: (i) the ability to operate in a completely continuous streamlined process from raw sugar cane extract to invert syrup product; (ii) the ability to operate using a reduced number of unit operations and/or more efficient unit operations to accomplish an invert syrup product. In other words, while in principle it is possible to obtain refined table sugar, dissolve it in water and load it onto an immobilized invertase reactor to convert it into invert syrup, the overall cost of such a process (cost of refining of the table sugar plus cost of converting it into invert syrup) would be unfavorable, in fact prohibitive. Similarly, while it is possible to add conventional refining steps and to pre-treat the sugar cane juice before it enters the solids/solubles removal operation described herein, such pre-treatment is not necessary and its addition must be balanced against the increased cost of performing it and the benefit derived from it.

Although the present invention has been shown and described with respect to preferred embodiments, various changes and modifications, which may become obvious to a person skilled in the art to which the invention pertains, are deemed to lie within the spirit and scope of this invention, as claimed below. All documents cited and listed below have been incorporated by reference in their entirety (excluding websites).

REFERENCES

Akgol, S., Kacar, Y., Denzli, A., and Arica, M. Y. Hydrolysis of sucrose by invertase immobilized onto novel magnetic poly (vinyl alcohol) microspheres. *Food Chem.* 74:281-288, 2001.

Avrameas et al. The cross linking of proteins with glutarealdehyde and its use for the preparation of immuno-adsorbents. *Immunochemistry* 6:53-66, 1969.

Bahar, T., and Tuncel, A. Immobilization of invertase onto cross linked poly(p-chloromethyl styrene) beads. *J. Appl. Polym. Sci.* 83:1268-1279, 2002.

Clarke, M. A., and Godshall, M. A. Chemistry and processing of sugarbeet and sugarcane. Sugar Series 9, Elsevier Sci. Publishers, Amsterdam, Netherlands, pp. 265-291, 1988.

Donovan, M. Sugar. In: Encyclopedia of Food Science, Food Technology and Nutrition. Vol. 7., R. Macrae, R. Robinson, and M. Sadler (eds.) Academic Press, London, UK, pp. 4441-4464, 1993.

D'Souza, S. F., and Godbole, S. S. Immobilization of invertase on rice husks using polyethyleneimine. *J. Biochem. Biophys. Methods* 52:59-62, 2002.

Food Agriculture Organization. http//apps.fao.org/, 2003.

Gornall, A. G., Bardawill, C. J., and David, M. M. Determination of serum proteins by means of the biuret reaction. *Journal Biological Chemistry* 177:751-765, 1949.

Messing, R. Immobilized Enzymes for Industrial Reactors. Academic Press. New York, N.Y., USA, Chap 1 and 2, p 1-38, 1975.

Kasumi T., Tsuji, Hayashi K., and Tsumura N., *Agr. Biol. Chem.*, 41 (10), 1977 (RECD 1978) 1865-1872.

Rosevear, A. *J. Chem. Technol. Biotechnol.* 34B:127-150, 1984.

Swain, T., and Hillis, W. E. The phenolics constituents of *Prunus domestica*. I. The quantitative analysis of phenolic compounds. *J. Sci. Food Agric.* 10:63-68, 1959.

Tanriseven, A., and Dogan, S. 2001. Immobilization of invertase within calcium alginate gel capsules. *Proc. Biochem.* 36:1081-1983, 2001.

Torres, R., Mateo, C., Fuentes, M., Palomo, J. M., Oriz, C., Fernandez Lafuente, R., Guisan, J. M., Tam, A., and Daminati, M. Reversible immobilization of invertase on sepabeads coated with polyethyleneimine: optimization of the biocatalyst's stability. Biotechnology Progress 18(6): 1221-1226, 2002.

Tsumura N., Kasumi T., and Ishikawa M. Immobilization of glucose isomerase in microbial-cells. *Starch/Staerke* 30: 420-423, 1978.

Tumturk, T., Arslan, F., Disli, A., and Tufan, Y. Immobilization of invertase attached to a granular dimer acid-co-alkyl polyamine. *Food Chem.* 69:5-9, 2000.

Miller, G. L., *Anal. Chem.*, 1959, 31: 426-428, 1959.

Hsieh, H. J, Liu, P. Ch, Liao, W. J. Immobilization of invertase via carbohydrate moiety on chitosan to enhance its thermal stability. *Biotechnology Letters.* 22: 1459-1464, 2000.

TABLE 1

Characteristics of sugarcane juice sequentially purified by microfiltration, ultrafiltration and anionic exchange resins.
n.m. = not measured by an analytical method

| | Sugarcane juice | | | | |
|---|---|---|---|---|---|
| | Raw | Micro-filtered Membrane 0.2μ | Ultra-filtered 10,000 MWCO | Anionic Exchange Column | Invertase Column |
| Sucrose Extraction Index | | | | | |
| Refractive Index | 18.2 | 17.7 | 16.3 | 16.0 | n.m. |
| Specific Rotation | 69.3 | 67.4 | 61.5 | 60.3 | n.m. |
| Conductivity (milimhos) | 1.56 | 1.62 | 1.58 | 1.50 | n.m. |
| Pol/Extraction Index | 16.8 | 16.4 | 15.0 | 15.0 | n.m.. |
| Purity | 92.4 | 92.5 | 92.2 | 92.1 | n.m. |
| Color[a] | | | | | |
| a* | 1.03 | 3.16 | 2.42 | −1.23 | n.m. |
| b* | 5.19 | 29.17 | 24.72 | 7.85 | n.m. |
| L | 25.18 | 51.81 | 56.65 | 65.73 | n.m. |
| E | 25.72 | 59.54 | 61.85 | 66.20 | n.m. |
| Hue | 78.9 | 83.9 | 84.4 | 98.8 | n.m. |
| Chemical Composition | | | | | |
| pH | 5.46 | 5.49 | 5.51 | 5.60 | 5.60 |
| Ash (%) | 0.37 | 0.31 | 0.23 | 0.08 | 0.26 |
| Protein (ppm) | 778 | 77 | 53 | 15 | 50 |
| Phenolics (ppm) | 532.96 | 436.50 | 353.45 | 130.85 | 436 |
| Reducing Sugars (g/l) | 9.25 | 8.78 | 8.68 | 8.69 | n.m. |
| Sucrose (g/l) | 202.26 | 179.47 | 176.20 | 173.41 | 13.75 |
| Glucose (g/l) | n.m. | n.m.. | n.m. | n.m. | 79.83 |
| Fructose (g/l) | n.m. | n.m. | n.m. | n.m. | 79.83 |

[a] L = lightness;
a* (+) = red color;
a* (−) = green color;
b* (+) = yellow;
b* (−) = blue;
E (color index) = $(L^2 + a^2 + b^2)^{1/2}$ [b]

TABLE 2

Characteristics of sugarcane juice sequentially purified by particle filtration, microfiltration and anionic exchange.
n.m. = not measured by an analytical method

| | Sugarcane juice | | | | |
|---|---|---|---|---|---|
| | Raw | Particle filtered 100 mesh | Microfiltered Membrane 0.2μ (Intermediate product) | Anionic Exchange Column | Invertase Column |
| Sucrose Extraction Index | | | | | |
| Refractive Index | 18.2 | 18.2 | 18.2 | 18.2 | n.m. |
| Specific Rotation | 69.3 | 68-69 | 67.4 | 60.3 | n.m. |
| Conductivity (milimhos) | 1.56 | 1.56 | 1.62 | 1.50 | n.m. |
| Pol/Extraction Index | 16.8 | 16.8 | 16.4 | 15.0 | n.m. |
| Purity | 92.4 | 92.4 | 92.5 | 92.1 | n.m. |
| Color[b] | | | | | |
| a* | 1.03 | 1-3 | 6.75 | −1.52 | 0.39 |
| b* | 5.19 | 6-28 | 24.42 | 14.94 | 2.11 |
| L | 25.18 | 26-50 | 41.7 | 61.17 | 66.14 |
| E | 25.72 | 26-50 | 48.79 | 62.99 | 66.17 |
| Hue | 78.9 | 80 ± 2 | 73.95 | 95.84 | 79.34 |
| Chemical Composition | | | | | |
| pH | 5.48 | 5.48 | 5.49 | 5.60 | 5.60 |
| Ash (%) | 0.37 | 0.37 | 0.31 | 0.08 | 0.26 |
| Protein (ppm) | 778 | Less than 778 | 77 | 15 | 50 |
| Phenolics (ppm) | 532.96 | Less than 532 | 436.50 | 130.85 | 436 |
| Reducing Sugars (g/l) | 9.25 | 9.10 | 9.15 | 9.20 | |
| Sucrose (g/l) | 202 | 195 | 193 | 190 | 19 |

TABLE 2-continued

Characteristics of sugarcane juice sequentially purified by particle filtration, microfiltration and anionic exchange.
n.m. = not measured by an analytical method

| | Sugarcane juice | | | | |
|---|---|---|---|---|---|
| | Raw | Particle filtered 100 mesh | Microfiltered Membrane 0.2μ (Intermediate product) | Anionic Exchange Column | Invertase Column |
| Glucose (g/l) | n.m. | n.m. | n.m. | n.m. | 85.5 |
| Fructose (g/l) | n.m. | n.m. | n.m. | n.m. | 85.5 |

[b]L = lightness;
a* (+) = red color;
a* (−) = green color;
b* (+) = yellow;
b* (−) = blue;
E (color index) = $(L^2 + a^2 + b^2)^{1/2}$ [b]

What we claim is:

1. A method for producing an invert syrup product from raw sugarcane juice comprising the steps of:
   (i) subjecting sugar cane juice to a filtration process having at least two filtration stages, a first stage and a finer stage, to remove contaminants while substantially retaining sugars present in the juice and a pasteurization stage to pasteurize and evaporatively concentrate said sugar juice by subjecting said sugar juice to a pasteurizing temperature between about 61.5° C. and about 72° C. for a time sufficient to pasteurize and simultaneously concentrate said sugar cane juice, thereby producing a concentrated filtered sugar cane juice;
   (ii) subjecting the concentrated filtered sugar cane juice to anion exchange to remove soluble contaminants from said concentrated filtered sugar cane juice which were not removed in the filtration process, thereby producing an anion exchange-treated sugar cane juice;
   (iii) contacting said anion exchange-treated sugarcane juice with an immobilized invertase enzyme to convert at least 90% of sucrose contained in said treated juice to a mixture of glucose and fructose and thereby to produce said invert syrup product.

2. The method of claim 1 wherein step (ii) is repeated at least once prior to proceeding to step (iii).

3. The method of claim 2 further comprising the step of:
   (iv) concentrating said anion-exchange treated juice prior to proceeding to step (iii).

4. The method of claim 3 wherein said step (iv) is performed immediately after performing said step (ii) once.

5. The method of claim 1 further comprising the step of:
   (iv) concentrating said anion-exchange treated juice prior to proceeding to step (iii).

6. The method of claim 5 wherein the concentrated anion exchange-treated juice has a sugar content of about 50° Brix; prior to being subjected to said step (iii).

7. The method of claim 1 wherein the sugar cane juice subjected to said step (i) is raw sugar cane juice not subjected to any processing steps after its extraction from sugar cane and before said step (i).

8. The method of claim 1 wherein the sugarcane juice subjected to said step (i) has been subjected only to a sedimentation step or a centrifugation step after its extraction from sugar cane to remove coarse solids.

9. The method of claim 1 further comprising the step of:
   (iv) further refining the invert syrup product produced in said step (iii).

10. The method of claim 1 further comprising the step of:
    (iv) concentrating the invert syrup product produced in said step (iii).

11. The method of claim 1 further comprising the steps of:
    (iv) concentrating the invert syrup product produced in said step (iii); and
    (v) further refining the invert syrup product produced in said step (iii).

12. The method of claim 1 wherein the sugar cane juice subjected to said step (i) has a sugar content of between about 16 and 23° Brix of which at least 90% is sucrose.

13. The method of claim 12 wherein the invert syrup product produced in said step (iii) has a sugar content within the range of about 50° to about 70° Brix of which at least 90% is a mixture of fructose and glucose.

14. The method of claim 12 wherein, prior to being subjected to said step (iii), the anion-exchange treated juice has a solids content no higher than about 1%, based on the sugar content; a phenolic content no higher than about 130 ppm; a protein content no higher than about 15 ppm; and a minerals content no higher than about 0.08%, based on the sugar content.

15. The method of claim 1 wherein said step (ii) a reflux portion of the anion-exchange treated juice is concentrated prior to being returned to the anion exchange treatment.

16. The method of claim 1 wherein said step (iii) is performed under controlled pH and temperature conditions.

17. The method of claim 1 wherein at least one of said steps (i) through (iii) is performed as a continuous unit operation.

18. The method of claim 17 wherein all of said steps (i) through (iii) are performed as continuous unit operations.

19. A method for producing an invert syrup product from raw sugarcane juice comprising the steps of:
    (a) subjecting sugar cane juice to a first filtration to remove a first fraction of solid contaminants from said juice thereby producing a first filtered sugarcane juice;
    (b) subjecting the first filtered sugar cane juice to finer filtration to remove a second fraction of solid contaminants from said first filtered juice and a first fraction of soluble contaminants from said first filtered juice and thereby to produce a finer filtered sugarcane juice;
    (c) pasteurizing the finer filtered sugarcane juice by subjecting it to a pasteurizing temperature between about 61.5° C. and about 72° C. for a time sufficient to pasteurize and simultaneously evaporatively concentrate said finer filtered sugarcane juice and thereby producing a concentrated finer filtered sugar cane juice;

(d) subjecting the concentrated finer filtered sugar cane juice to anion exchange, to remove a second fraction of soluble contaminants from said concentrated finer filtered sugar cane juice, thereby producing an anion exchange-treated sugar cane juice;

(e) contacting said anion exchange-treated sugarcane juice with an immobilized invertase enzyme to convert at least 90% of sucrose contained in said treated juice to a mixture of glucose and fructose and thereby to produce said invert syrup product.

20. The method of claim 19 wherein step (d) is repeated at least once prior to proceeding to step (e).

21. The method of claim 19 further comprising the step of:
(f) concentrating said anion-exchange treated juice prior to proceeding to step (e).

22. The method of claim 21 wherein the concentrated anion exchange-treated juice has a sugar content of about 40-50° Brix; prior to being subjected to said step (e).

23. The method of claim 19 wherein the sugarcane juice subjected to the first filtration in said step (a) has been subjected only to a sedimentation or a centrifugation step after its extraction from sugar cane to remove coarse solids.

24. The method of claim 19 further comprising the step of:
(f) further refining the invert syrup product produced in said step (e).

25. The method of claim 19 further comprising the step of:
(f) concentrating the invert syrup product produced in said step (e).

26. The method of claim 19 wherein the sugar cane juice subjected to said step (a) has a sugar content of between about 16° and 23° Brix of which at least 90% is sucrose and wherein the invert syrup product produced in said step (e) has a sugar content within the range of about 50° to about 70° Brix of which at least 90% is a mixture of fructose and glucose.

27. The method of claim 26 wherein, prior to being subjected to said step (e), the anion-exchange treated juice has a solids content no higher than about 1%, based on the sugar content; a phenolic content no higher than about 130 ppm; a protein content no higher than about 15 ppm; and a minerals content no higher than about 0.08%, based on the sugar content.

28. The method of claim 19 wherein said step (d) a reflux portion of the anion-exchange treated juice is concentrated prior to being returned to the ion exchange treatment.

29. The method of claim 19 wherein said step (e) is performed under controlled pH and temperature conditions.

30. The method of claim 19 wherein at least one of said steps (a) through (e) is performed as a continuous unit operation.

31. The method of claim 19 wherein said first filtration step (a) comprises passing said juice through a particles filter having mesh no larger than 100 Mesh US (100 Tyler).

32. The method of claim 31 wherein said finer filtration step (b) comprises microfiltration.

33. The method of claim 19 wherein said first filtration step (a) comprises microfiltration.

34. The method of claim 33 wherein said finer filtration step comprises ultrafiltration having a retentate limit of 10,000 Daltons molecular weight.

35. The method of claim 19 further comprising the step of:
(f) evaporatively concentrating to the range of 35° to 55° Brix said first filtered sugarcane juice of step (a) prior to step (b).

36. The method of claim 35 wherein the step (a) comprises particle filtration and the step (b) comprises microfiltration.

37. The method of claim 19 wherein the step (a) comprises particle filtration and the step (b) comprises microfiltration.

38. The method of claim 19 wherein the step (a) comprises particle filtration and the step (b) comprises microfiltration followed by ultrafiltration.

39. A method for producing an invert syrup product from raw sugarcane juice comprising the steps of:

(a) subjecting sugar cane juice to a first filtration to remove a first fraction of solid contaminants from said juice thereby producing a first filtered sugarcane juice;

(b) evaporatively concentrating the first filtered sugarcane juice to the range of 35° to 55° Brix at a pasteurizing temperature between about 61.5° and about 72° C. for a time sufficient to pasteurize said first filtered sugarcane juice and thereby producing a concentrated filtered sugarcane juice;

(c) subjecting the concentrated filtered sugarcane juice to finer filtration to remove a second fraction of solid contaminants from said concentrated filtered sugarcane juice and a first fraction of soluble contaminants from said concentrated filtered sugarcane juice and thereby to produce a finer filtered sugarcane juice;

(d) passing the finer filtered sugar cane juice through an anion exchange column to remove a second fraction of soluble contaminants from said finer filtered sugar cane juice, thereby producing an anion exchange-treated sugar cane juice;

(e) contacting said anion exchange-treated sugarcane juice with an immobilized invertase enzyme to convert at least 90% of sucrose contained in said treated juice to a mixture of glucose and fructose and thereby to produce said invert syrup product.

* * * * *